R. S. PEIRCE.
FASTENING DEVICE.
APPLICATION FILED DEC. 5, 1918.

1,395,453.

Patented Nov. 1, 1921.

Inventor.
Ralph S. Peirce.
By G. L. Cragg Atty.

UNITED STATES PATENT OFFICE.

RALPH S. PEIRCE, OF HINSDALE, ILLINOIS.

FASTENING DEVICE.

1,395,453.  Specification of Letters Patent.  Patented Nov. 1, 1921.

Application filed December 5, 1918. Serial No. 265,400.

*To all whom it may concern:*

Be it known that I, RALPH S. PEIRCE, citizen of the United States, residing at Hinsdale, in the county of Du Page and State of Illinois, have invented a certain new and useful Improvement in Fastening Devices, of which the following is a full, clear, concise, and exact description.

My invention relates to fastening devices provided with rods or bolts having enlargements thereon that operate in conjunction with expansible or gripping elements to secure the rods within holes or recesses that are formed in walls, ceilings, etc.

The invention has, among its objects, an improved formation of the bolt or rod enlargement to enable such enlargement more efficiently to perform its function; such a formation of the enlargement that it may be normally maintained in assembly with the expansion element when the devices are held in stock or storage; and such a configuration of the bolt or rod enlargement that it may readily be made of sheet metal stamped to the desired shape.

Figure 1:
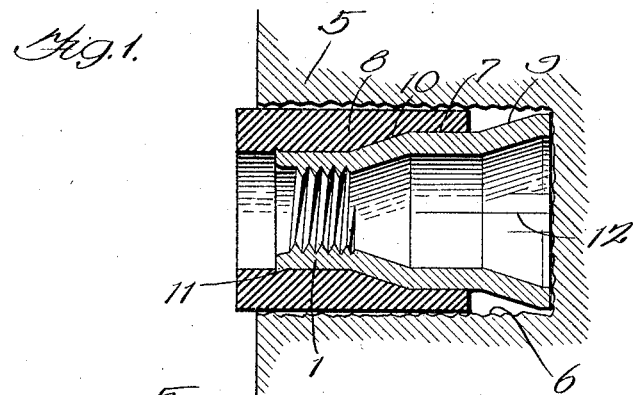
Figure 2:
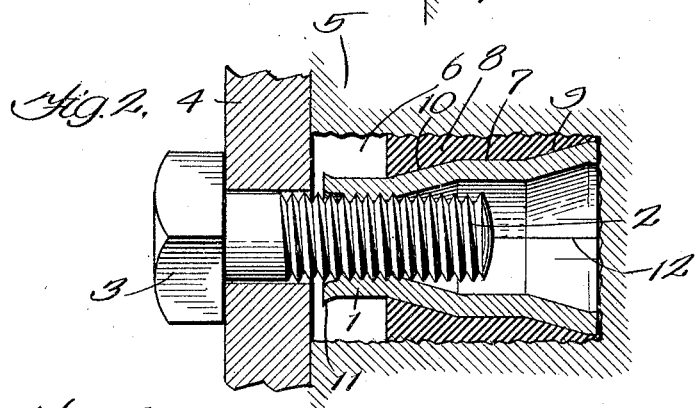
Figure 3:
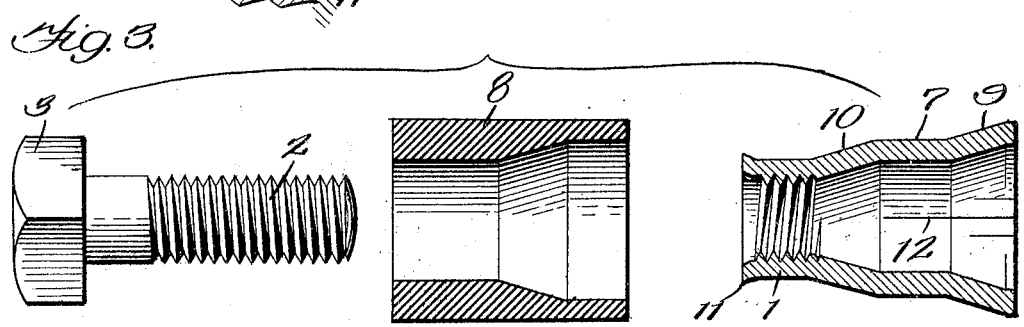
Figure 4:
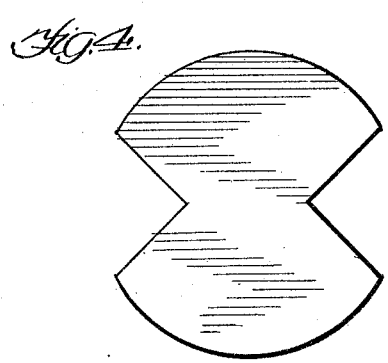
Figure 5:
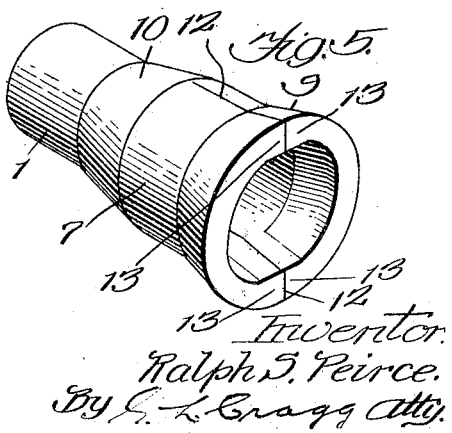

I will explain my invention more fully by reference to the accompanying drawing showing the preferred embodiment thereof and in which Figure 1 is a longitudinal sectional view of the bolt or rod enlargement which is shown as being separately formed from the bolt but to which separate formation the invention is not to be limited; Fig. 2 shows the structure of Fig. 1 assembled with the bolt or rod; Fig. 3 shows the expansible element and the enlargement in section and the bolt or rod in elevation; Fig. 4 is a view in elevation of a blank piece of sheet metal from which the bolt or rod enlargement may be struck; and Fig. 5 is a perspective view illustrating the preferred form of bolt or rod enlargement.

Like parts are indicated by similar characters of reference throughout the different figures.

In the form of the invention illustrated the bolt enlargement 1 is separately made from the rod or bolt 2 with which it desirably has threaded connection, whereby the rod and sleeve are in normally fixed engagement. This rod is shown as being in the form of a bolt having a head 3. An object 4, which is to be held in place by the structure, is shown as intervening between the bolt head 3 and the wall 5. An opening 6 is formed in the wall for receiving the inner end of the bolt or rod and the enlargement thereof through the agency of which such rod is to be held in fixed relation with the wall. As illustrated, the enlargement 1 is therefore in the nature of a sleeve formed to have engagement with the rod preferably by means of threads formed in a part of the bore of the sleeve and upon the rod. The sleeve is desirably of uniform thickness throughout which enables me to make it of sheet metal. It also provides the maximum space within the sleeve, consistent with the strength thereof, for receiving dust and chips produced in forming the hole containing the fastening device. In the formation of the sleeve a blank having the appearance shown in Fig. 4 is employed, this blank being of uniform thickness and being so operated upon by a suitable punch and die as to form the sleeve illustrated in Fig. 5 in one operation except for cutting off the smaller closed end formed in the punching operation and the threading. The smaller end of the sleeve has its bore threaded to have connection with the rod, the exterior of this portion of the sleeve, or rod enlargement, being cylindrical to be substantially parallel throughout with the axis of the rod. Said sleeve or enlargement has another portion 7 which has element 8 thereupon and expansible laterally of the sleeve and the bolt or rod, this expansible element being preferably in the nature of a lead sleeve that surrounds the sleeve 1 which is of hard metal such as iron to be relatively harder than the lead. This portion 7 of the sleeve or enlargement 1 is cylindrical to have the exterior thereof substantially parallel throughout with the axis of the rod. The portion 7 of the sleeve 1 has a sloping head 9 which is of a diameter substantially corresponding with the diameter of the hole 6 in the wall 5 that is to contain the device. The sleeve 1 has another sloping portion 10 which is spaced apart longitudinally of the rod from the tapering portion 9, the two tapering portions 9 and 10 tapering in the same direction at substantially the same angle to the axis of the rod. The rod enlargement 1 thus increases in diameter rearwardly to have expanding engagement with the laterally expansible element 8. Fig. 1 shows the positions of the parts, minus the rod or bolt, which are relatively preserved when they are in stock or storage. The lead sleeve 8 and the hard metal sleeve 1 are normally maintained in the relationship shown either by the smaller cylindrical end of the sleeve 1 or the larger cylindrical portion of said sleeve or by the coöperation of these two cylindrical portions, the portions of the bore of the lead sleeve 8 that engage the cylindrical portions of the sleeve 1 being initially of slightly less diameter than the diameters of said cylindrical portions of the sleeve 1 so that the sleeve 8 may be driven into tight fit with said cylindrical portions of the sleeve 1 thereby to have the assembly of these sleeves maintained. The smaller end of the sleeve 1 is desirably outwardly flared or laterally extended at its extremity as indicated at 11. The tapering portion 10 also constitutes laterally extended portions of the sleeve 1. The laterally extended portions at 11 and 10 are located at places spaced apart longitudinally of the sleeve 1 and exceed the diameter of a bore portion of the expansible element 8 that is between the laterally extended portions of the sleeve 1 at 10 and 11, whereby the sleeve or enlargement 1 and said expansible element are normally maintained in assembly.

In one use of the device the sleeve 1 is bottomed in the hole 6 whereafter a suitable tool is employed to drive the expansible lead sleeve 8 inwardly to have the shape shown in Fig. 2. The sloping or conical portions 9 and 10 slope outwardly. The smaller and outer cylindrical end of the sleeve 1, (that end which is in threaded engagement with the rod 2), the outer rising sloping or conical portion 10 of said sleeve, the ensuing cylindrical portion 7, and the innermost sloping or conical portion or head 9 provide a contacting surface, to be forcibly engaged by the expansible element 8, that is of maximum extent with respect to the comparatively small amount of lead in the element 8. The tool that compacts the lead sleeve 8 embraces the small outer cylindrical end of the sleeve 1 and fills the gap between this end and the surrounding wall 5 so that the lead may not exude forwardly to a material extent.

In the preferred embodiment of the invention the hard metal sleeve 1 is made from sheet material that is blanked as illustrated in Fig. 4, this blank being operated upon to produce the structure illustrated in Fig. 5. The sleeve 1 is expanded at its inner end and is split longitudinally from its larger expanded end toward its smaller end along lines 12 that are substantially equidistant to divide the sleeve 1 into equal portions at its expanded end. In the punching operation that produces the sleeve 1 follow-up die mechanism is employed, a part of which operates to form the thimble-like structure in which the slits 12 extend substantially to the bottom thereof, these slits enabling the formation of the sleeve. In further movement of the die mechanism the bottom of this thimble is drawn outwardly to elongate the thimble below the slits 12, the diameter of this extended portion of the thimble being then reduced. In further movement the bottom of the thimble is punched through to form the sleeve as it appears in Fig. 3 except for the threading of the bore of the sleeve. It is obvious that other means and methods may be employed for producing the sleeve 1. The sleeve, where split, has portions 13 in such interengagement as to maintain the contour of the sleeve at its split end. These portions 13 are desirably upset or thickened and have abutting engagement. The sleeve, being integral at its contracted or smaller end and split at its expanded or larger end, resists at its smaller end any expansible influence thereon on the part of the bolt or rod engaging it and has its contour maintained at its expanded and split end by the compressive action of the inwardly driven soft metal sleeve 8.

While I have herein shown and particularly described the preferred embodiment of my invention I do not wish to be limited to the precise details of construction shown as changes may be readily made without departing from the spirit of my invention, but having thus described my invention I claim as new and desire to secure by Letters Patent the following:—

1. A member having an enlargement formed with outer and inner outwardly sloping portions and a portion between these sloping portions that is substantially parallel with the axis of the member; in combination with an element engageable with said portions of the member enlargement and expansible thereby laterally of the member.

2. A member having an enlargement formed with outer and inner outwardly conical portions and a substantially cylindrical portion between these conical portions; in combination with an element engageable with said portions of the member enlargement and expansible thereby laterally of the member.

3. A rod having an enlargement threaded upon the rod and formed with outer and inner outwardly sloping portions and a portion between these sloping portions that is substantially parallel with the axis of the rod; in combination with an element engageable with said portions of the rod enlargement and expansible by said enlargement laterally of the rod.

4. A rod having an enlargement threaded upon the rod and formed with outer and inner outwardly sloping conical portions and a substantially cylindrical portion between these conical portions; in combination with an element engageable with said portions of the rod enlargement and expansible by said enlargement laterally of the rod.

In witness whereof, I hereunto subscribe my name this third day of December, A. D. 1918.

RALPH S. PEIRCE.